(12) United States Patent
Wahl et al.

(10) Patent No.: US 8,714,066 B2
(45) Date of Patent: May 6, 2014

(54) APPARATUS FOR HOLDING A PLATE-LIKE MATERIAL DURING A SEPARATION PROCESS

(75) Inventors: Eberhard Wahl, Weilheim (DE); Martin Blaser, Vogt (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 612 days.

(21) Appl. No.: 12/636,994

(22) Filed: Dec. 14, 2009

(65) Prior Publication Data
US 2010/0132526 A1    Jun. 3, 2010

Related U.S. Application Data

(63) Continuation of application No. PCT/EP2008/004819, filed on Jun. 16, 2008.

(30) Foreign Application Priority Data

Jun. 14, 2007   (DE) .......................... 10 2007 027 987

(51) Int. Cl.
    *B26D 7/01*    (2006.01)
    *B26F 3/00*    (2006.01)
(52) U.S. Cl.
    USPC ................... 83/152; 83/177; 83/374; 83/422; 83/424
(58) Field of Classification Search
    USPC ........... 83/152, 177, 422, 424, 374, 941, 100; 198/468.01–468.5, 678.1–687.1, 198/750.11, 750.12, 750.13, 470.1–472.1
    See application file for complete search history.

(56) References Cited

U.S. PATENT DOCUMENTS 3,495,492 A * 2/1970 Gerber et al. .................... 83/374
3,535,965 A * 10/1970 Baldwin ......................... 83/129
(Continued)

FOREIGN PATENT DOCUMENTS

DE        8518255      11/1985
DE       20112006       4/2002
(Continued)

OTHER PUBLICATIONS

International Search Report from corresponding PCT Application No. PCT/EP2008/004819, mailed Sep. 30, 2009, 3 pages.
(Continued)

*Primary Examiner* — Laura M Lee
(74) *Attorney, Agent, or Firm* — Fish & Richardson P.C.

(57) ABSTRACT

An apparatus for holding a plate-like material during a separation process. The apparatus includes a separating device that is movable, during the separation process, in a first axial direction that is transverse to a second axial direction that the plate-like material is conveyed in during the separation process. The apparatus also includes first and second transport tables. The first transport table has a first contact surface and the second transport table has a second contact surface. The first contact surface and the second contact surface are spaced apart by a gap along which the separating device is movable. The apparatus also includes at least one holding device that is operable hold the plate-like material relative to the first and second contact surfaces such that the plate-like material is movable along the first and second contact surfaces. The holding device is configured to support the plate-like material such that a first surface of the plate-like material, on which a cutting beam of the separating device impinges, faces toward the first and second contact surfaces during the separation process.

22 Claims, 7 Drawing Sheets

(56) References Cited

U.S. PATENT DOCUMENTS

| | | | | |
|---|---|---|---|---|
| 3,585,888 | A | * | 6/1971 | Wiatt .................................. 83/14 |
| 3,750,507 | A | * | 8/1973 | Gerber et al. ..................... 83/169 |
| 3,777,604 | A | * | 12/1973 | Gerber ............................. 83/374 |
| 3,797,341 | A | * | 3/1974 | Bystron ............................ 83/14 |
| 3,841,187 | A | * | 10/1974 | Gerber et al. ..................... 83/451 |
| 3,848,327 | A | * | 11/1974 | Gerber et al. ..................... 29/559 |
| 3,877,334 | A | | 4/1975 | Gerber |
| 3,978,748 | A | * | 9/1976 | Leslie et al. ....................... 83/53 |
| 4,137,492 | A | * | 1/1979 | Schultz ........................... 361/194 |
| 4,137,804 | A | * | 2/1979 | Gerber et al. ..................... 83/177 |
| 5,140,800 | A | * | 8/1992 | Martin et al. ..................... 53/441 |
| 5,239,809 | A | * | 8/1993 | Long ................................. 53/513 |
| 2004/0237735 | A1 | | 12/2004 | Diem |
| 2007/0144322 | A1 | * | 6/2007 | Niedermeyer .................... 83/53 |
| 2008/0168876 | A1 | * | 7/2008 | Kilian et al. ..................... 83/424 |

FOREIGN PATENT DOCUMENTS

| EP | 1547927 | | 6/2005 | |
| --- | --- | --- | --- | --- |
| JP | 61206586 | | 9/1986 | |
| JP | 4106009 | * | 4/1992 | ............ B65G 15/14 |
| WO | WO2007/003299 | * | 1/2007 | ............ B23K 26/08 |

OTHER PUBLICATIONS

International Preliminary Report on Patentability for corresponding PCT Application No. PCT/EP2008/004819, issued Jan. 12, 2010, 7 pages.

* cited by examiner

APPARATUS FOR HOLDING A PLATE-LIKE MATERIAL DURING A SEPARATION PROCESS

CROSS-REFERENCE TO RELATED APPLICATIONS

This application is a continuation of and claims priority under 35 U.S.C. §120 to PCT/EP2008/004819, filed on Jun. 16, 2008, and designating the U.S., which claims priority under 35 U.S.C. §119 to German Patent Application No. 10 2007 027 987.8, filed on Jun. 14, 2007. The contents of both the prior applications are hereby incorporated by reference in their entirety.

TECHNICAL FIELD

The invention relates to an apparatus for holding a plate-like material during a separation process.

BACKGROUND

An apparatus for holding plate-like materials during a separation process is known from DE 85 18 255 U1. This apparatus includes a separating device that is movable, during the separation process, in at least the x-direction. The plate-like material is fed in a y-direction, transverse to the x-direction, during the separation process. For transport purposes and during the machining process, the plate-like material is supported by a contact surface of a first and a second transport table. Each transport table is driven by a separate transport belt. A gap is formed between the first and the second transport table. The width of the gap is adjustable.

In the course of the machining of the plate-like material, a cutting beam emerges from the bottom surface of the plate-like material during the separation process. In this process, downward-protruding burrs are produced on the edges of the cutting beam. During the further transport of the plate-like material, the downward-protruding burrs represent an obstacle, preventing the plate-like material from lying completely flat on the transport table. Moreover, vibrations may occur, which may lead to a detaching or a tilting of the produced workpiece(s) with respect to the residual grid. Protruding downwards, the burrs may in addition cause damage to the transport tables.

SUMMARY

In general, the invention relates to an apparatus for holding a plate-like material during a separation process.

One aspect of the invention features an apparatus for holding a plate-like material during a separation process. The apparatus includes a separating device that is movable, during the separation process, in a first axial direction that is transverse to a second axial direction that the plate-like material is conveyed in during the separation process. The apparatus also includes first and second transport tables. The first transport table has a first contact surface and the second transport table has a second contact surface. The first contact surface and the second contact surface are spaced apart by a gap along which the separating device is movable. The apparatus also includes at least one holding device that is operable to hold the plate-like material relative to the first and second contact surfaces such that the plate-like material is movable along the first and second contact surfaces. The holding device is configured to support the plate-like material such that a first surface of the plate-like material, on which a cutting beam of the separating device impinges, faces toward the first and second contact surfaces during the separation process. This provides a so-called overhead arrangement.

Embodiments may include one or more of the following features and advantages.

During the separation process, the plate-like material can be held such that burrs formed on a second, bottom surface of the plate like material avoid contact with the contact surfaces of the first and second transport tables.

In certain embodiments, this overhead arrangement can provide the advantage that, due to the at least one holding device, a loading and unloading of the plate-like material is also possible.

In addition, the overhead arrangement has the advantage that during the execution of the at least one separation process in the plate-like material both the plate-like material itself and the bottom surface of the plate-like material may undergo additional processing. The processing of the bottom surface may take place prior to, during, or after the separation process. The processing of the bottom surface may also be provided in the form of a pre-processing step or a post-processing step. By way of example, the bottom surface of the plate-like material may undergo engraving, gluing, deburring and/or conserving.

In some cases, the overhead arrangement has the advantage that the bottom surface of the plate-like material may be cooled to prevent workpiece(s) and a residual grid, which are formed by the separation process, from overheating.

In certain embodiments, the holding device includes negative-pressure-creating holding members that provide a negative pressure (suction). The holding members can be assigned to the first contact surface or the second contact surface and/or integrated into the first contact surface or the second contact surface. Thus, a simple configuration of the transport table with respect to the overhead arrangement may be provided, with the possibility of integrating the holding members, and can be also a substantial part of the holding device, into the transport table.

In some embodiments, the first transport table and/or the second transport table includes a transport belt that is guided by a plurality of cylinders.

In certain embodiments, the first contact surface and/or the second contact surface is formed between at least two cylinders that are spaced apart from each other along a plane.

In some embodiments, the transport belt is formed by a plurality of individual belts. The holding members can be arranged between the individual belts, such that, on the one hand, a driving of the transport belt and a transport of the plate-like material is made possible and, on the other hand, a negative pressure is created for holding the workpiece. Alternatively, the transport belt can include a belt with holes. The arrangement of the holding members in or close to the contact surface has the advantage that, owing to the negative pressure, a workpiece formed during the separation process and a residual grid can be fixed with respect to the contact surfaces of the transport tables. As a result, undesirable vibrations can be avoided. Moreover, this configuration can allow the machined, plate-like material to be extracted in its entirety from the apparatus. Thus, it is possible to avoid a collision with parts or deformed workpieces falling off, as it is not necessary to arrange any additional members or components on the bottom surface of the plate-like material.

The holding members of the holding device can be individual suction apparatuses, suction pads, and/or suction bars. In this way, it is possible to achieve the negative pressure acting on the plate-like material. These negative pressure generating elements may be moved rotationally or translationally about deflection points of the transport table which limit the contact surface and about which the transport belt is deflected.

In certain embodiments, a beam capturing device for capturing the cutting beam of the separating device is provided underneath the gap. The beam capturing device can help to receive and remove slab and cutting dust and/or dissipate residual energy occurring during the machining process. The beam capturing device can be designed to be movable in a synchronous manner with the separating device. In addition, a sensor assembly or process supporting members may be provided.

In some embodiments, at least one auxiliary member or supporting member is provided on the bottom surface of the plate-like material and is assigned to the cutting gap. Such an auxiliary member serves as a kind of insertion support for workpieces, preventing them from tilting away as they pass the cutting gap and thus enhancing the process reliability. A supporting member of this type can be provided as a safety element when heavy, plate-like materials are to be held.

Such auxiliary members can include flexible rollers, brush rollers, or drums. The auxiliary members can be movable with respect to the gap and/or at a distance from the contact surface.

In certain embodiments, the apparatus can also include one or more bearing members. The bearing members can be arranged beneath the first and second transport tables. The bearing members can be used, for example, when very heavy, plate-like materials are to be machined. Each of the bearing members can include a revolving supporting belt or a plurality of flexible rollers, brush rollers or drums. In the case of an overhead arrangement, such bearing members can be helpful for securely mounting the plate-like material and for allowing the plate-like material to be moved dynamically. The actual holding and transporting functions can be performed by the at least one holding device. When bearing members in the form of revolving belts are used, the revolving belts can be designed to have a very soft surface in order to help provide a vibrationless application and an at least partial immersion of burrs into contact surfaces of the revolving belts.

In some embodiments, at least one of the first and the second transport tables is movable relative to the gap. Thus, it is not only possible to change the position of the gap but, in addition, such a transport table may, at the same time, serve as a loading and unloading station for the apparatus.

In certain embodiments, the at least one holding device includes at least one gripper member that is operable to engage a lateral edge of the plate-like material or to engage an edge region adjacent thereto. Such embodiments can have the advantage that the bottom surface of the plate-like material may be provided free of any additional members, thus providing an overhead arrangement. In addition, this configuration can have the advantage that, after performing one or several separation processes, the residual grid remains securely fixed with respect to the transport table, such that uniform working conditions for the separation processes as well as a secure removal of the plate-like material from the apparatus can be provided.

In some embodiments, the at least one gripper member is moveable in the first axial direction.

In certain embodiments, the at least one gripper member is adjustable to the width of the plate-like material. By way of example, the plate-like material may be positioned in such a manner that one lateral edge is parallel to a lateral edge of the transport table, with the gripper members on the opposite side being adjustable to different widths of the plate-like material, which may vary, for example, when plate-like materials that have already been partially machined are being processed.

In some embodiments, the at least one gripper member can be provided with a tensioning device, such that the plate-like material is held by applying a tension. Thus, the plate-like material may be held in place without the application of any additional negative pressure. Finished workpieces, which are formed during the separation process, may either be received in a collecting device directly after the separation process or may be held close to the residual grid by small land portions (micro joints). Such land portions may be broken easily, allowing the workpieces to be rapidly detached from the residual grid.

In certain embodiments, the at least one holding device can include a combination of gripper members and negative-pressure-creating holding members.

In certain embodiments, the holding device is formed by a fluid film provided between the first and/or second contact surfaces and the first surface of the plate-like material. Thus, the holding or tensioning of the plate-like material with respect to the first and/or second contact surfaces can be achieved by a surface tension produced by the fluid film. This configuration can have the additional advantage that the fluid film may be used at the same time for conserving the at least one workpiece. Moreover, a cooling effect may be achieved in the gap by the fluid film, which can make it possible to reduce overheating of the resulting workpiece and to reduce the thermal stress to which the transport belts of the transport tables are exposed.

The first transport table can include supply orifices for delivering fluid for creating the fluid film. The supply orifices can be arranged, for example, in a first region of the first contact surface of the first transport table. Suction devices can be provided in a second region of the first contact surface, spaced apart from the first region, for absorbing the fluid film. In this way, a continuous fluid film for building up the surface tension and for guiding the plate-like material along the contact surface of the at least one transport table can be provided. The fluid film is sucked off or considerably reduced in thickness, such that a protective film will remain before the plate-like material leaves the transport table. The second transport table can have the same construction for providing a fluid film.

In some embodiments, the holding device can be formed by flat electrodes integrated into the first and/or second contact surfaces. Thus, it is possible to create an electrostatic field in, and adjacent to, the contact surface by which the plate-like material is held in place. This holding device can be advantageous with plate-like materials made of plastic or having a plastic coating.

In some cases, the holding device is formed by a tacky supporting material that is applied and removed, or activated and inactivated, at deflection points of the first and/or second transport tables. Such a tacky supporting material may be provided with further components by which an additional benefit for ulterior processing steps is enabled.

Other aspects, features, and advantages are in the description, drawings, and claims.

DETAILED DESCRIPTION

Figure 1:
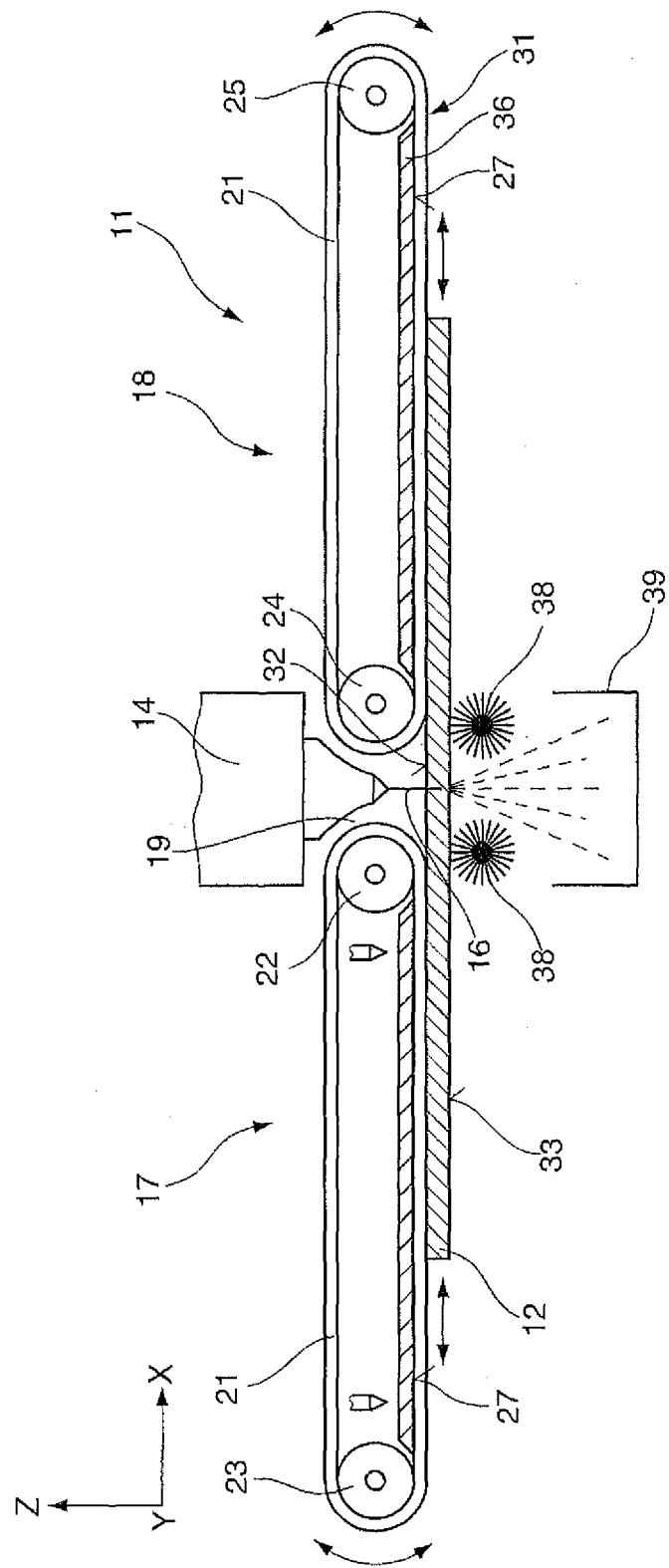
FIG. 1 is a schematic side view of an apparatus for holding a plate-like material during a separation process.

FIG. 1 represents a schematic side view of an apparatus 11 for holding a plate-like material during a separation process. An apparatus 11 of this type serves for holding the plate-like material 12 processed by a separating device 14. During the separation process a beam 16 is directed at the plate-like material 12 from the separating head or cutting head of the separating device 14. This beam 16 can be provided in the form of electromagnetic radiation, e.g., a laser beam, or in the form of a water jet, or the like. The apparatus 11 includes two transport tables 17, 18 between which a gap 19 is formed. The transport tables 17, 18 have each a respective transport belt 21. The transport belts 21 are arranged independently of each other and guided and tensioned by a plurality of cylinders 22, 23, 24, 25. Between the cylinders 22, 23 and 24, 25, respectively, a contact surface 27 for the plate-like material 12 is formed. The transport tables 17, 18 can each be provided on a machine frame or can be provided on a common machine frame. Alternatively, the respective contact surfaces 27 of the transport tables 17, 18 can also be variably adjustable in the longitudinal sense, such that prior, during, or after the separation process, the respective contact surfaces 27 of the transport tables 17, 18 can be variable in their dimensions independently of each other.

The separating device 14 is movable in the y-direction along the gap 19 during the machining of the plate-like material 12. Furthermore, the separating device 14 can be displaceable in and against a feed direction of the plate-like material 12, which corresponds to the x-direction. A working range of the separating device 14 is defined by the maximum distance of movement of the separating head or cutting head in the x-direction and in the y-direction, provided the separating device 14 is actually movable in the y-direction. For machining the plate-like material 12, the gap 19 is designed to be positioned beneath the separating device 14. During the machining of the plate-like material 12, the cylinders 22, 24 assigned to the gap 19 can be moved, e.g., in a synchronous manner, within a working range of the separating device 14. This may be carried out by a change in the position of the cylinders 22, 24 or by a displacement of the transport tables 17, 18 relative to each other.

The transport tables 17, 18 each include at least one holding device 31 that allows the plate-like material 12 to be positioned with a first surface 32 of the plate-like material 12, i.e. with a top surface on which the cutting beam 16 impinges during the separation process, relative to the contact surface 27 and be guided along said surface. Thus a so-called overhead arrangement or unsupported arrangement is created, in which a second surface 33, opposite the first surface 32, is provided in a self-supporting manner. Owing to the positioning of the first surface 32 relative to the contact surface 27 of the transport tables 17, 18, a burr produced in the course of the separating process will never touch the contact surface 27 of the transport tables 17, 18. Moreover, slag and cutting dust produced during the laser beam cutting are prevented from adhering to the contact surfaces 27 of the transport tables 17, 18. In addition, the attractive force of the holding device 31 employed for positioning the plate-like material 12 relative to the contact surface 27 of the transport tables 17, 18, a compensation of workpiece deformations can be achieved. At the same time, the application of a suction force makes it possible to prevent undesirable vibrations, which enhances the machining quality.

Figure 2:
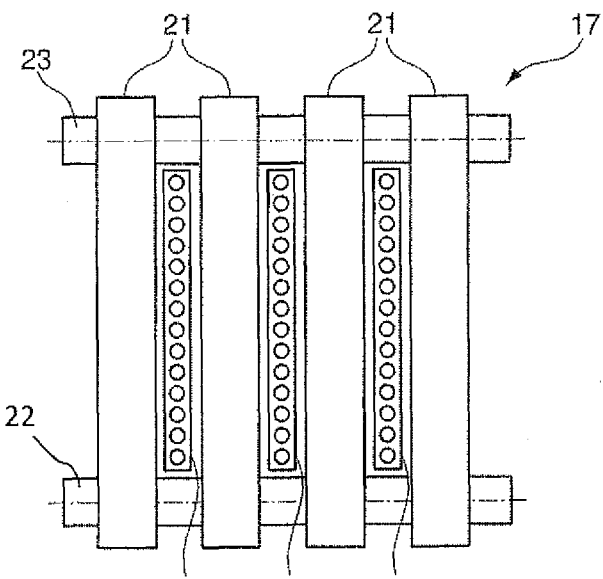
FIG. 2 is a schematic bottom view of a transport table of the apparatus of FIG. 1.
Figure 3:
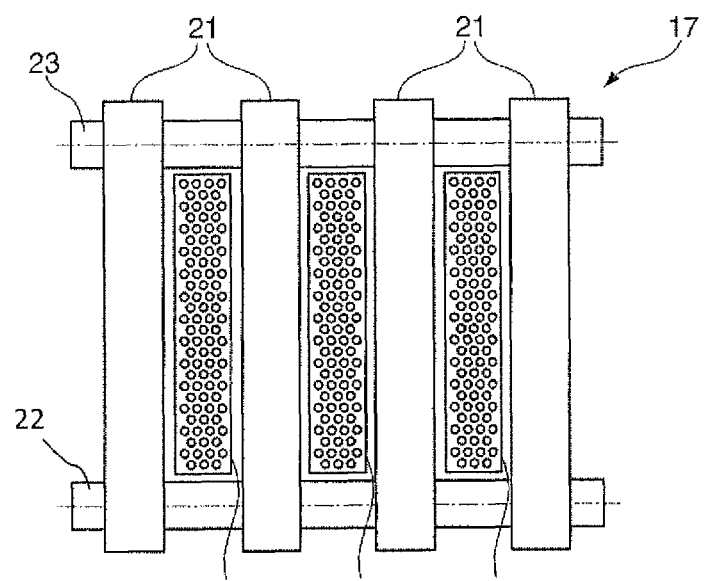
FIG. 3 is a schematic bottom view of an alternative embodiment of the transport table of FIG. 1.

Referring to FIGS. 1-3, the holding device 31 is designed to consist of holding members 36 that provide negative pressure (suction). These holding members 36 can include, a plurality of individual suction apparatuses, one or several suction pads (as shown in FIG. 2) and/or suction bars (as shown in FIG. 3) that extend in the feed direction and are oriented parallel with the transport belt 21. These holding members 36 can be provided in a separate arrangement between several transport belts.

Alternatively, a transport belt can be provided with a series of holes or the like, which are associated with the suction apparatuses, suction bars or suction pads. This configuration can help to provide a tight contact between the plate-like material 12 and the contact surface 27. At the same time, this configuration makes it possible, once the production of the workpieces having undergone a separation process is accomplished, to keep workpieces that are formed during the separation process within a residual grid so as to be jointly removed or unloaded.

Auxiliary members 38 are provided adjacent to the gap 19. The auxiliary members contact the second surface 33 of the plate-like material 12 and serve as a insertion support for workpieces, preventing them from tilting away. Such auxiliary members 38 can be in the form of flexible rollers, brush rollers, or drums.

A beam capturing device 39 can be positioned beneath the gap 19. The beam capturing device 39 can receive and remove slab and cutting dust discharged at the second surface 33 of the plate-like material 12 and/or can help to dissipate residual energy. At the same time, the auxiliary members 38 can also help to clean the second surface 33 of the plate-like material 12.

Figure 4:
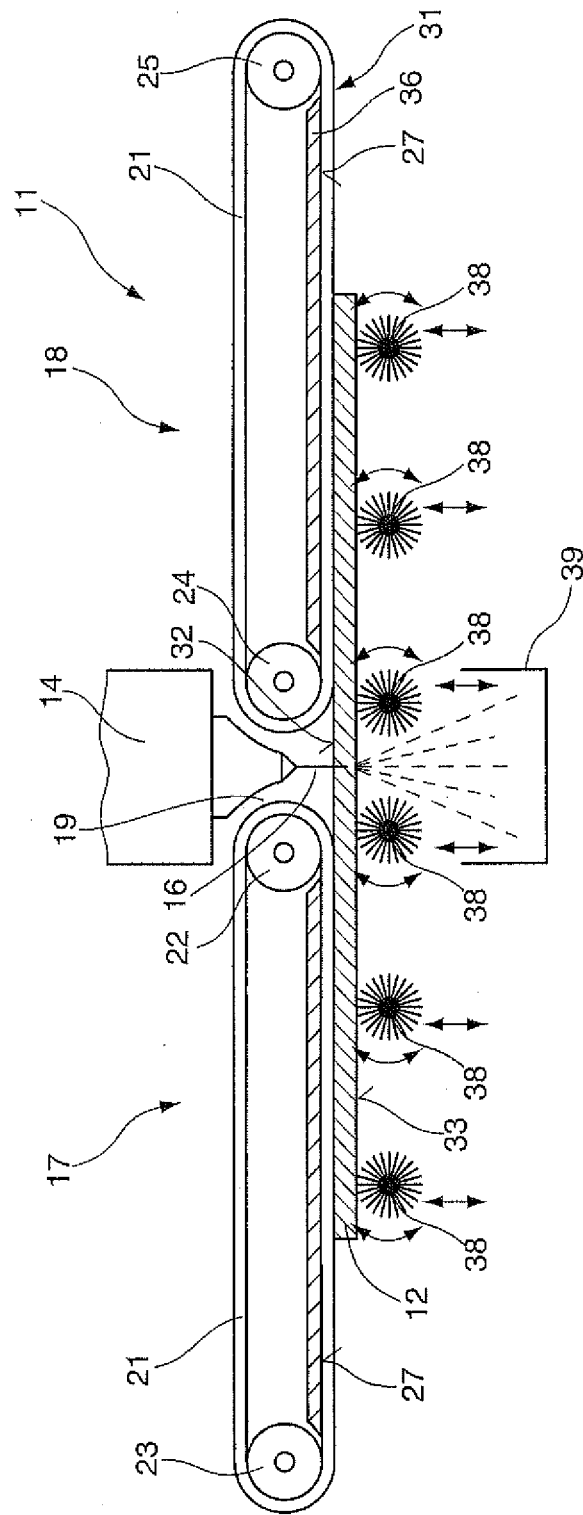
FIG. 4 is a schematic side view of another embodiment of an apparatus for holding a plate-like material during a separation process, which includes additional auxiliary members.

FIG. 4 represents an embodiment, differing from FIG. 1. As far as the coinciding features are concerned, reference is made to FIG. 1. As shown in FIG. 4, additional auxiliary members 38 contact the second surface 33 of the plate-like material 12 as a means for securing transport thereof. These auxiliary members 38 can be driven in and against the transport direction of the plate-like material 12. In addition, the auxiliary members 38 are adjustable with respect to the distance separating them from each other and with respect to the thickness of the plate-like material 12.

Figure 5:
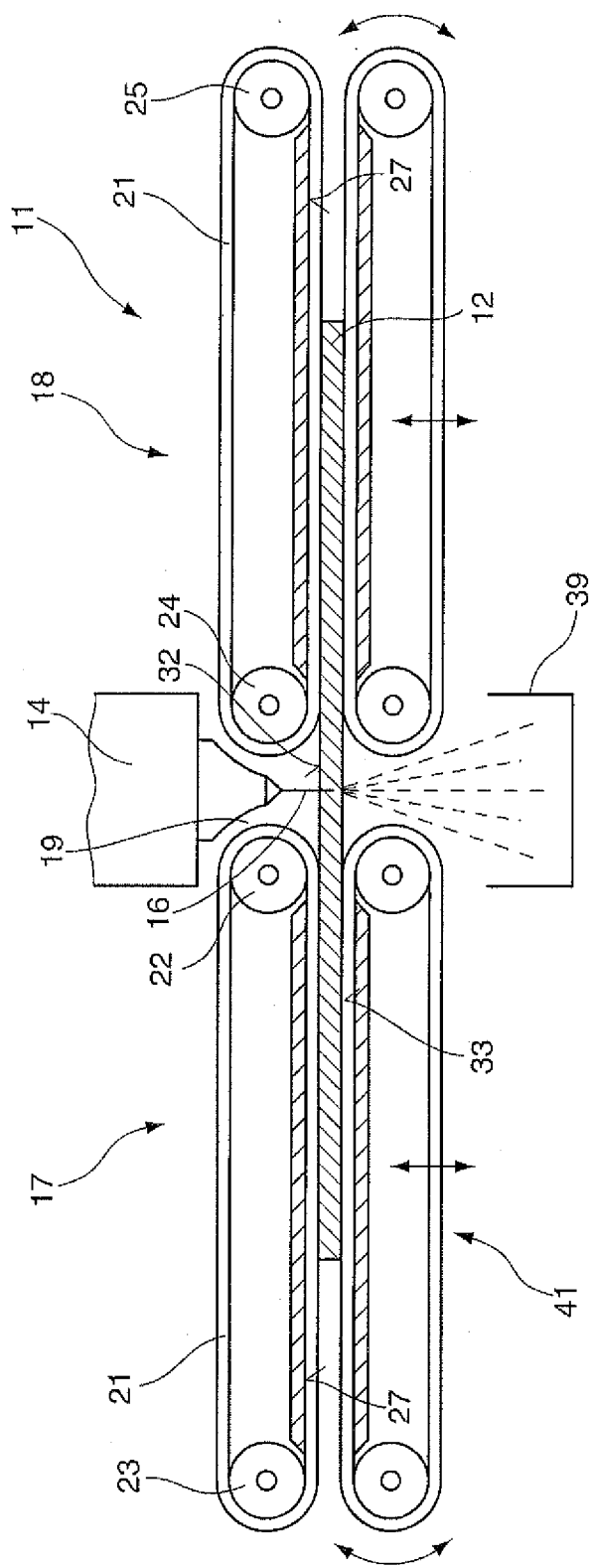
FIG. 5 is a schematic side view of another embodiment of an apparatus for holding a plate-like material during a separation process, which includes bearing members.

FIG. 5 represents another embodiment, differing from FIG. 4. As shown in FIG. 3, bearing members 41 are provided as an alternative to the plurality of individual auxiliary members 38. The bearing members 41 can be revolving supporting belts. The bearing members 41 provide enhanced security for the material transport, with the movement of the plate-like material 12 in and against the feed direction being caused by the transport tables 17, 18. The supporting belts of the bearing members 41 can have a very soft surface in order to avoid feedback during the machining of the plate-like material 12 that might otherwise be caused by contact with burrs formed on the second surface 33 of the plate-like material 12.

Figure 6:
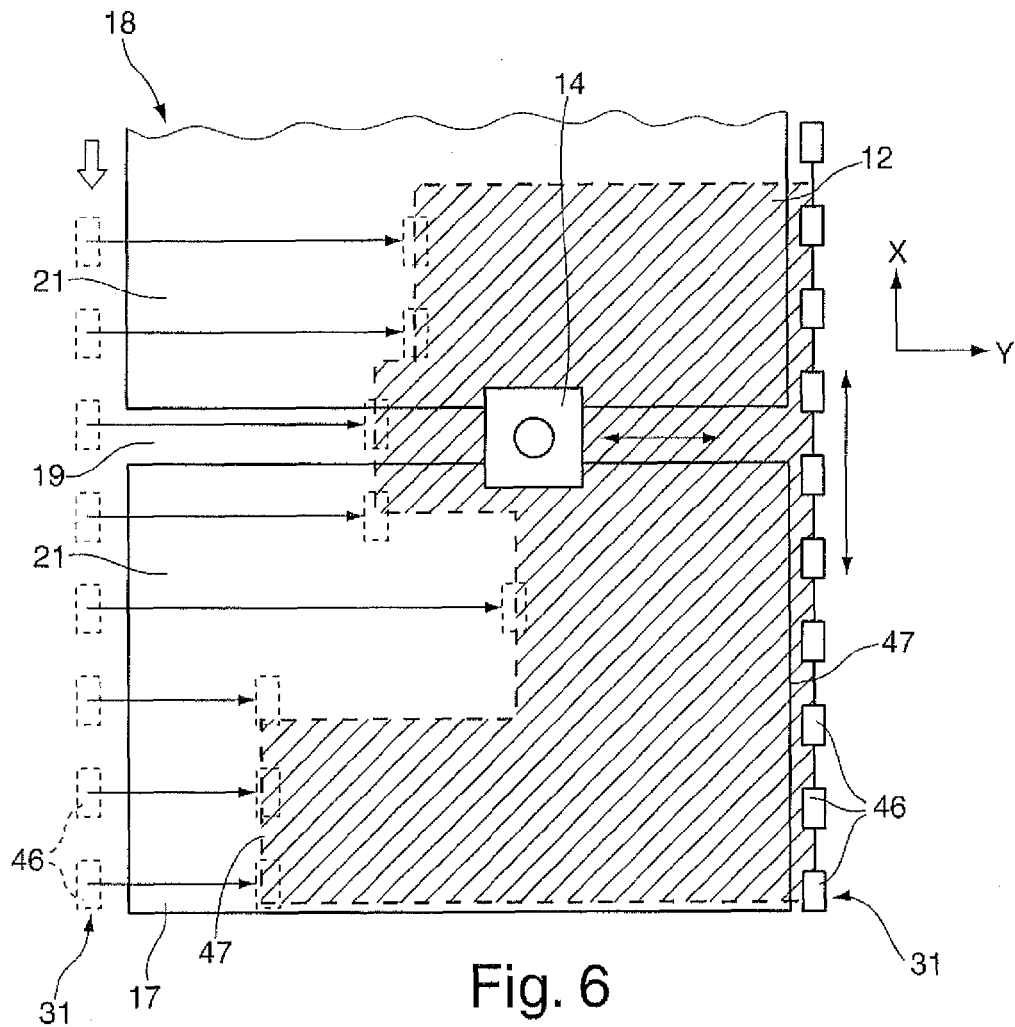
FIG. 6 is a schematic top view of another embodiment of an apparatus for holding a plate-like material during a separation process.
Figure 7:
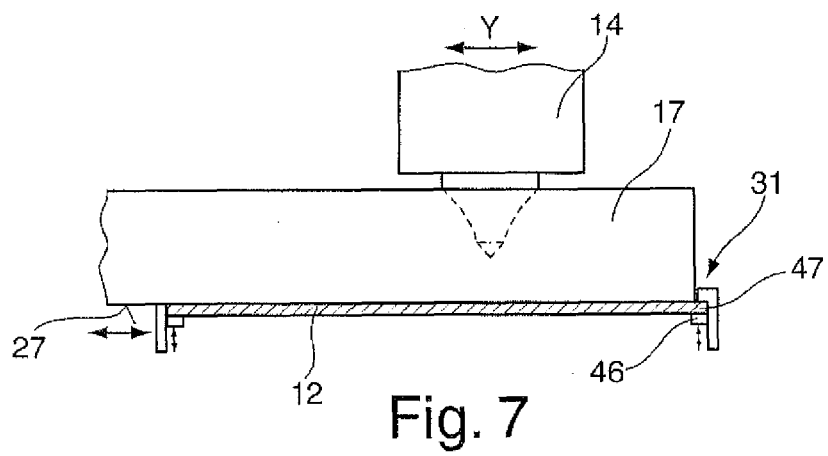
FIG. 7 is a schematic side view of the apparatus of FIG. 6.

FIG. 6 represents a schematic view of the contact surface 27 of the transport tables 17, 18 having a further alternative configuration of the holding device 31. FIG. 7 shows a schematic side view of the apparatus of FIG. 6 in or against the feed direction of the plate-like material 12. The alternative configuration of the holding device 31 according to FIGS. 4 and 5 includes gripper members 46 that are applied to a lateral edge 47 or to an edge region of the plate-like material 12 adjacent thereto. In this way, the plate-like material 12 is positioned with respect to the contact surface 27 and moved in or against the feed direction. The gripper members 46 are movable relative to the width of the contact surface 27 and/or the width of the transport belt 21. Thus it is possible, for example, to machine plate-like materials 12 having a contoured lateral edge, as represented by the left lateral edge 47 of the plate-like material 12 shown in FIG. 6. Therefore, the flexibility for the processing of plate-like materials 12 is enhanced. Thus, not only a rectangular plate-like material 12 but also remainders of said plate-like material 12 can be held. The same is true, by analogy, of the configuration of a transport table 17, 18 having negative-pressure-creating holding members 36. The gripper members 46 can be quick-action gripping members or clamping members that are applied on the lateral edge 47 of the plate-like material 12. In addition, opposing gripper members 46, which are applied on opposite lateral edges 47, respectively, make it possible to apply a tension to the plate-like material 12. Thus, this holding device 31 can also be used independently of negative-pressure-creating holding members 36.

As an alternative, the holding device 31 can include a combination of the negative-pressure-creating holding members 36 and the gripper members 46. Thus, the holding members 36 can be used, for example, to hold the completely fabricated workpieces within the residual grid until a joint unloading of the workpieces and residual grid is initiated. Furthermore, the gripper members 46 may ensure that the residual grid will not become detached spontaneously before the unloading takes place. In cases in which the holding device 31 includes only gripper members 46, the workpieces produced by the separation process may be secured with respect to the residual grid by small land portions, such that a joint unloading of the workpieces and the residual grid is possible. Alternatively, once the production of the workpieces has been accomplished, these may also be received in a collecting device arranged underneath the gap 19.

Figure 8:
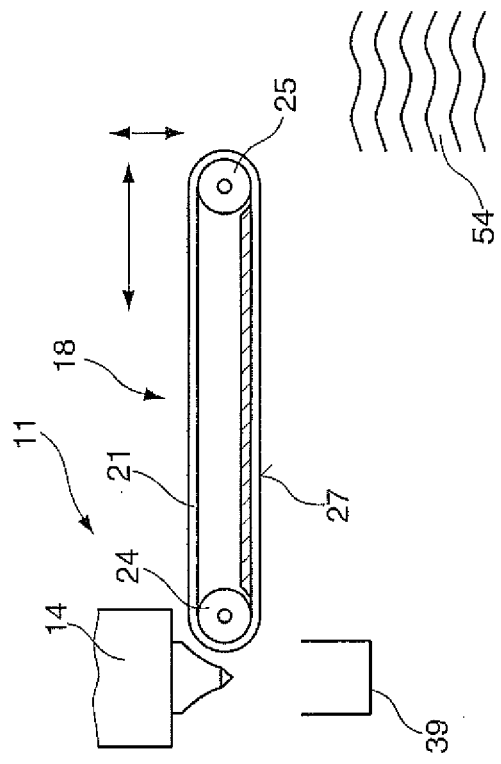
FIG. 8 is a schematic side view illustrating loading and unloading processes employing the apparatus of FIG. 1.
Figure 8:
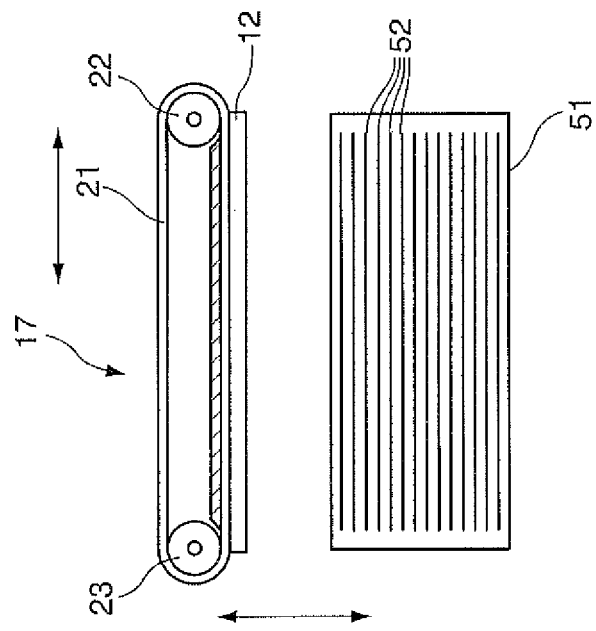

FIG. 8 schematically represents the loading and unloading of the apparatus 11 with plate-like material 12. The transport table 17 is realized in such a way as to be movable as an entire unit with respect to the separating device 14. Thus, it is possible for the transport table 17 to be movable towards a pile 51 of not yet machined, plate-like material 12 or non-processed material. Owing to the holding device 31 a simple pickup of the uppermost layer 52 of the plate-like material 12 is possible. Subsequently, the transport table 17 is moved to the separating device 14 and a gap 19 is adjusted. The transport belt 21 of the transport table 17 is set in motion, such that the plate-like material 12 is moved in the y-direction. As this feed movement is carried out, a first separation process may take place, even though the plate-like material 12 has not yet reached contact with the contact surface 27 of the second transport table 18. As soon as a leading end of the plate-like material 12 reaches the contact surface 27 of the second transport table 18, it will be positioned and held in place with respect to the contact surface 27 of the transport table 18 by the holding device 31 of the second transport table 18. The transport belts 21 of the first and second transport tables 17, 18 are driven, at least during this transition phase, in a synchronous manner.

After the machining of the plate-like material 12 has been accomplished, the transport table 18 may be transferred to an unloading position. In this unloading position, the residual grid is separated from the finished parts or workpieces. This may be done by transporting the machined, plate-like material 12 in the feed direction and by providing a collecting recipient directly under the cylinder 25 for receiving the workpieces, which are no longer subject to any holding force once they have left the contact surface 27. The residual grid can be pushed on top of a stack 54

Figure 9:
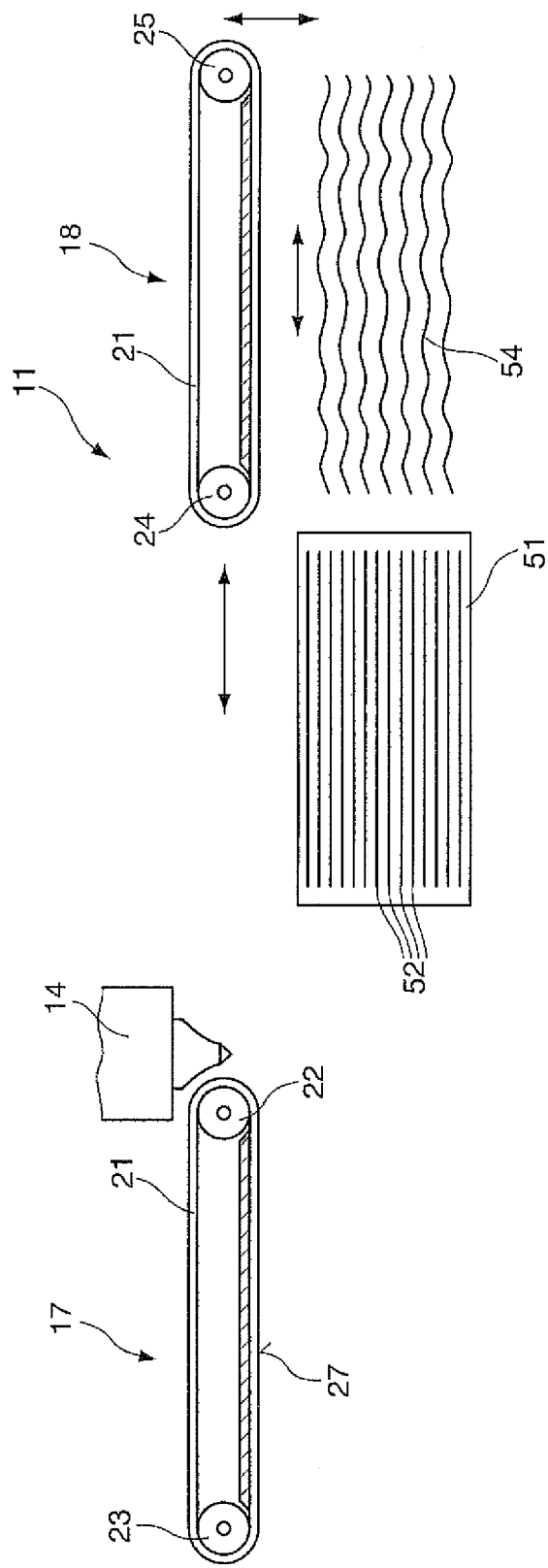
FIG. 9 is a schematic side view of another loading and unloading process employing the apparatus of FIG. 1.

FIG. 9 represents a further alternative embodiment for loading and unloading a processing machine. In this embodiment, a stack 51 of not yet machined, plate-like material 12 and a stack 54 for the residual grid are arranged adjacent to each other, such that the loading and unloading is performed by one of the transport tables 17 or 18. By way of example, the second transport table 18 picks up the first layer 52 from the stack 51 and is moved into the processing area next to the separating device 14. Then, the plate-like material 12 is transferred to the first transport table 17 in order to undergo, subsequently, one or several separation processes, as it transferred back to the second transport table 18. Then, the second transport table 18 is positioned next to the stack 54, where the residual grid is placed after the finished parts have been separated. As an alternative to the pickup of non-machined, plate-like material from the stack 51, the transport table 17 or 18 may also be movable to a further storing unit from where to pick up non-machined, plate-like material 12 and to deposit the residual grid after the machining process has been carried out. By such an arrangement, as well as by the one shown in FIG. 8, it is possible, in addition, to integrate a processing machine into a production line.

The above embodiments of the holding devices 31 can be combined with each other in any desired manner.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus for holding a plate-shaped material during a separation process, the apparatus comprising:
a separating device that is movable, during the separation process, in a first axial direction that is transverse to a second axial direction that the plate-shaped material is conveyed in during the separation process;
a first transport table operable to transport the plate-shaped material and having a first contact surface; and
a second transport table operable to transport the plate-shaped material and having a second contact surface, wherein the first contact surface and the second contact surface are spaced apart by a gap along which the separating device is movable,
wherein the first transport table comprises a holding device that is operable to suspend the plate-shaped material from the first transport table in a fixed manner relative to the first contact surface, such that the plate-shaped material is movable with the first contact surface, and the second transport table comprises a holding device that is operable to suspend the plate-shaped material from the second transport table in a fixed manner relative to the second contact surface, such that the plate-shaped material is movable with the second contact surface, wherein the holding devices and the first and second transport tables are disposed above the plate-shaped material, and wherein the first and second transport tables are configured to support the plate-shaped material while a cutting beam of the separating device passes through the gap between the first and second contact surfaces and impinges on a first surface of the plate-shaped material that faces toward the first and second contact surfaces during the separation process.

2. The apparatus of claim 1, wherein the holding devices comprise negative-pressure-creating holding members.

3. The apparatus of claim 1, wherein the first transport table comprises a transport belt, and a plurality of cylinders that guide the transport belt.

4. The apparatus of claim 3, wherein the first contact surface is formed between at least two cylinders spaced apart from each other along a plane.

5. The apparatus of claim 2, wherein the negative-pressure-creating holding members comprise a plurality of discrete suction apparatuses, suction pads, or suction bars.

6. The apparatus of claim 1, further comprising at least one sensor assembly, process supporting members, or a beam capturing device,
wherein the at least one sensor assembly, the process supporting members, or the beam capturing device is arranged below the gap.

7. The apparatus of claim 6, wherein the beam capturing device is movable in the second axial direction.

8. The apparatus of claim 1, wherein adjacent to the gap and assigned to a second surface of the plate-shaped material, from which the cutting beam emerges during the separation process, at least one auxiliary member or at least one bearing member is provided.

9. The apparatus of claim 8, wherein the auxiliary member comprises a flexible roller, a brush roller, or a drum.

10. The apparatus of claim 8, wherein the bearing member comprises a revolving belt.

11. The apparatus of claim 8, wherein the bearing member has a contact surface underlying the first transport table.

12. The apparatus of claim 1, wherein the first transport table is movable relative to the gap.

13. The apparatus of claim 1, wherein each of the holding devices comprises at least one gripper member operable to engage a lateral edge of the plate-shaped material or to engage an edge region of the plate-shaped material.

14. The apparatus of claim 13, wherein the at least one gripper members are movable in the first axial direction.

15. The apparatus of claim 13, wherein the at least one gripper members are adjustable to the width of the plate-shaped material.

16. The apparatus of claim 13, wherein each of the holding devices comprises a plurality of gripper members arranged to engage opposing lateral edges of the plate-shaped material or to engage opposing edge regions of the plate-shaped material, and wherein the pluralities of gripper members hold the plate-shaped material by applying a tensile stress.

17. The apparatus of claim 1, wherein the holding devices are formed by a fluid film provided between the first and second contact surfaces and the first surface of the plate-shaped material.

18. The apparatus of claim 17, wherein the first transport table includes supply orifices arranged in a first region of the first contact surface for delivering the fluid film, and wherein the first transport table includes suction devices arranged in a second region of the first contact surface, spaced apart from the first region, for absorbing the fluid film.

19. The apparatus of claim 1, wherein each of the holding devices is formed by flat electrodes integrated into the first or second contact surface, respectively, or wherein each of the holding devices is formed by a tacky supporting material.

20. The apparatus of claim 1, wherein each of the holding devices is integral with its respective transport table.

21. The apparatus of claim 1, wherein each of the holding devices is integral with the first or second contact surface, respectively.

22. The apparatus of claim 1, wherein the first and second transport tables and the holding devices are configured such that the plate can be suspended from both the first and second transport tables simultaneously.

* * * * *